Patented May 29, 1928.

1,671,257

UNITED STATES PATENT OFFICE.

CURT RÄTH, OF BERLIN, GERMANY.

PROCESS FOR THE PREPARATION OF HYDRAZINO PYRIDINE COMPOUNDS.

No Drawing. Application filed June 16, 1926, Serial No. 116,437, and in Germany November 11, 1924.

The object of this invention is the preparation of beta-pyridyl-hydrazine and its derivatives. I have discovered that these compounds can be prepared by the action of stannous chloride or similar reducing agent on beta-pyridyl-diazonium chloride or its corresponding derivative.

Example 1.

*Preparation of beta-hydrazino-pyridine.—* 47 grams of meta-amino-pyridine are placed in 500 cc. concentrated hydrochloric acid (ice cooled), and diazotized by the addition of 38 grams sodium nitrite dissolved in 300 cc. water. The diazo solution is then poured into an ice cooled solution of 300 grams stannous chloride in 250 grams water. The tin double salt of the hydrazine precipitates and after standing a short time is filtered. The free base is isolated by decomposing the double salt with alkali, repeated extraction of the alkaline solution with ether and subsequent evaporation of the latter. The free base forms white crystals, melting at 53–55°. The compound becomes brown in the air, can not be distilled undecomposed, and reduces Fehling's solution immediately in the cold. The reaction is shown by the following:

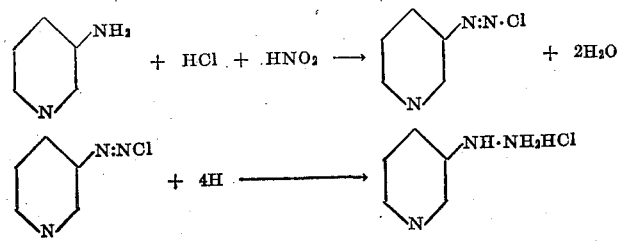

Example 2.

*Alpha-chlor-beta¹-hydrazino-pyridine.—* 64 grams of alpha-chlor-beta¹-amino pyridine are dissolved in about 500 cc. concentrated hydrochloric acid, and diazotized by the addition of a cold solution of 37 grams sodium nitrite in 200 cc. water. After standing a short time, the reaction mixture is added, with stirring, to a well cooled solution of 300 grams stannous chloride in 250 cc. concentrated hydrochloric acid. A faintly pink colored tin double salt of alpha-chlor-beta¹-hydrazino-pyridine precipitates on standing. By decomposing the double salt with alkali and repeated extraction of the alkaline solution with ether and subsequent evaporation of the latter, the hydrazine is obtained as faintly yellowish needles. Yield—about 70%. On recrystallization from benzol the hydrazine is obtained as colorless needles and melts at 129–130°. The compound reduces Fehling's solution on warming slightly. The course of the reaction is similar to that of Example 1.

The compounds are used therapeutically, or as initial materials in the preparation of products which are of importance therapeutically.

What I claim is:
1. Process for the preparation of a β-hydrazino pyridine compound which comprises diazotizing the corresponding β-amino pyridine and reducing the diazonium compound thus formed.

2. Process for the preparation of a β-hydrazino pyridine compound which comprises diazotizing the corresponding β-amino pyridine and reducing the diazonium compound thus formed by means of stannous chloride.

3. Process for the preparation of a substituted β-hydrazino pyridine compound which comprises diazotizing the corresponding substituted β-amino pyridine and reducing the substituted diazonium compound thus formed.

4. Process for the preparation of a β-hydrazino pyridine compound which comprises reducing the corresponding β-pyridine diazonium chloride.

5. Process for the preparation of a β-hydrazino pyridine compound which comprises reducing the corresponding β-pyridine diazonium chloride by means of stannous chloride.

6. Process for the preparation of a β-hydrazino pyridine compound which comprises diazotizing the corresponding β-amino pyridine and reducing the diazonium compound thus formed by means of stannous chloride and recovering the free hydrazine compound by treatment of the solution with alkali and subsequent extraction of the solution with ether.

7. Process for the preparation of a β-hydrazino pyridine compound which comprises reducing the corresponding β-pyridine diazonium chloride, and recovering the free hydrazine compound by treatment of the solution with alkali and subsequent extraction of the solution with ether.

Signed at Berlin, in the province of Brandenburg and State of Prussia, this 21st day of May, A. D. 1926.

Dr. CURT RÄTH.